United States Patent [19]

Bronovsky et al.

[11] 4,164,061
[45] Aug. 14, 1979

[54] METHOD OF MAKING ROTOR BLADES OF RADIAL-AXIAL HYDRAULIC MACHINES

[76] Inventors: Grigory A. Bronovsky, 7 Sovetskaya, 7, kv. 6; Mikhail O. Bukchin, Poljustrovsky prospekt, 7, kv. 34; Alexandr I. Goldfarb, B. Okhtensky prospekt, 6, korpus 2, kv. 288, all of Leningrad, U.S.S.R.

[21] Appl. No.: 827,342

[22] Filed: Aug. 24, 1977

[51] Int. Cl.² .................................................. B23P 15/04
[52] U.S. Cl. ........................... 29/156.8 B; 228/159; 416/213 R; 113/116 W; 113/116 V; 113/116 D
[58] Field of Search ............... 29/156.8 B, 156.8 P; 228/159, 160, 162, 182; 416/213, 229; 113/116 W, 116 V, 116 Y, 116 D

[56] References Cited
U.S. PATENT DOCUMENTS

| 998,897 | 7/1911 | Heath | 416/229 |
|---|---|---|---|
| 1,006,209 | 10/1911 | Heath | 29/156.8 P |
| 1,389,146 | 8/1921 | Levasseur | 416/229 |
| 1,785,543 | 12/1930 | Dornier | 416/229 |
| 1,984,044 | 12/1934 | Sukohl | 416/229 |
| 2,295,454 | 9/1942 | Cesare | 416/229 |
| 3,660,882 | 5/1972 | Widowitz et al. | 29/156.8 P |

FOREIGN PATENT DOCUMENTS

| 287193 | 3/1928 | United Kingdom | 29/156.8 P |
|---|---|---|---|
| 567143 | 1/1945 | United Kingdom | 416/229 |

*Primary Examiner*—Lowell A. Larson
*Assistant Examiner*—Daniel C. Crane
*Attorney, Agent, or Firm*—Burgess, Ryan and Wayne

[57] ABSTRACT

A method of making rotor blades of radial-axial hydraulic machines, wherein a plain blade blank is obtained by welding together at least two sheet pieces that compose the blank in the direction of principal variation of the cross-sectional thickness thereof. The thickness of each of said sheet pieces is selected to be not less than a maximum cross-sectional thickness of the blank at its portion defined by said sheet piece. Then the blank is machined until the required blade outline is obtained, after which the blade blank bent to obtain the desired blade shape.

1 Claim, 5 Drawing Figures

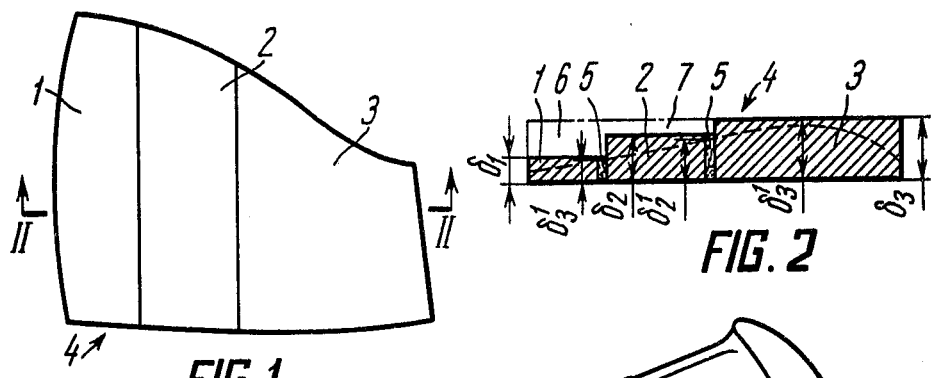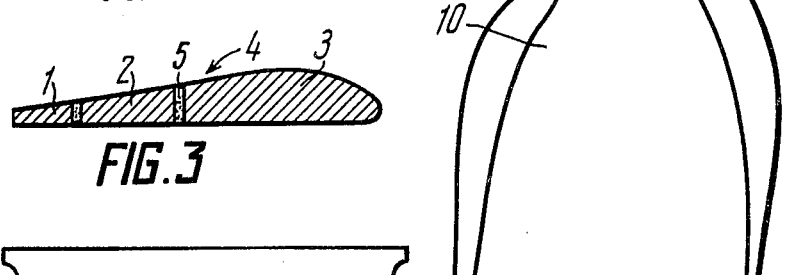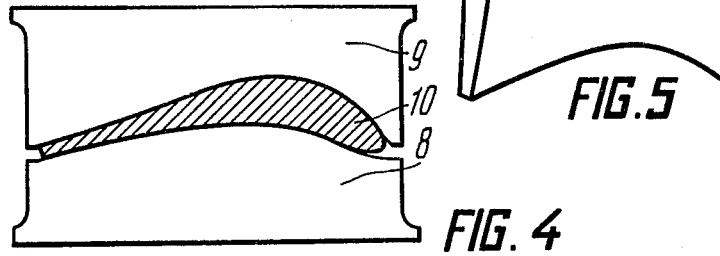

METHOD OF MAKING ROTOR BLADES OF RADIAL-AXIAL HYDRAULIC MACHINES

The present invention relates generally to metal blades such as those used in radial-axial hydraulic machines and is particularly adapted to methods of making rotor blades of radial-axial hydraulic machines, such as hydraulic turbines and pumps.

One prior-art method of making rotor blades of radial-axial hydraulic machines comprises producing a plain blank by casting or cutting from rolled sheet along the blade developed contour, followed by machining said blank to obtain a required blade blank outline and bending said blank into the required blade shape.

In case of a cast blank, its contour before machining is very close to the estimated one. However, some subsurface casting defects are inescapable which are not tolerated within the blade-to-crown welding zones and at the blade trailing edge. Thus, such defects need to be detected in due time and rectified, whereupon faulty spots must be repaired by welding.

It is therefore advantageous to employ the method of making a blank from rolled sheet stock featuring more compact metal structure and incorporating only minor flaws and defects which as a rule may be left uncorrected on the blades of hydraulic machines. In addition, prior-art methods of producing blade blanks from rolled sheet stock employ a sheet thickness somewhat in excess of the maximum blank thickness so as to compensate for possible and permissible waviness of the sheet stock and to leave a machining allowance along the blank outline. Since the blank thickness range is subject to variation within a broad range, especially in the direction from the leading blade edge to its trailing edge, the aforesaid technique results sheet thickness eventuates in too low a rolled sheet utilization factor (in the range of 0.3 to 0.4 allowing for cutting a blank along its contour) and in a very high labor expenditure required for profile machining of a blank.

It is therefore an object of the present invention to attain a more efficient utilization of the material the blade blank is made from.

It is another object of the present invention to render the machining of a blade blank less labor consuming.

As herein described in a method of making rotor blades of radial-axial hydraulic machines, comprising preparing a plain blade blank, machining said blank to obtain a required blade blank outline and subsequently bending the machined blank into a preset blade shape, according to the invention the blank is prepared by welding together at least two sheet pieces that compose the blank in the direction of principal variation of the blank cross-sectional thickness, the thickness of each of said sheet pieces being not less than the maximum cross-sectional thickness of the blade blank at the portion thereof defined by said sheet piece.

The herein disclosed method of making blade blanks comprising a number of smaller components, makes it possible to practise more rational cutting of rolled sheet stock and, moreover, to use thinner sheets for blade portions located within the area of the trailing edge. This fact enables one to increase the rolled sheet utilization factor 1.5 to 2 times. In addition, partial approximation of the blank concave shape to the preset curvilinear one results in labor consumption about half that of a machining process.

Further objects and advantages of the present invention will become more clearly understood from the following disclosure of a specific embodiment thereof to be read in conjunction with the accompanying drawings, wherein:

FIG. 1 is a plan view of a welded sheet blade blank, according to the invention;

FIG. 2 is a cross-sectional view through the blank of FIG. 1 taken along the line II—II;

FIG. 3 is the blank of FIG. 2 after having been properly machined;

FIG. 4 is the blank of FIG. 3 as placed in between the shaping elements of a die unit;

FIG. 5 is a perspective view of the finished blade.

The method of making rotor blades of radial-axial hydraulic machines disclosed in the present invention resides in the following.

At least two (three in the given particular case) component pieces 1 (FIG. 1) of a plain blank 4 are cut from rolled sheet stock along the blade developed contour, said pieces composing the blank 4 in the direction of preferable varying the cross-sectional thickness thereof from the trailing towards the leading edge of the blade.

The thickness values of rolled sheets that define thickness values $\delta_1$ (FIG. 2), $\delta_2$, $\delta_3$ of the respective component pieces 1, 2, 3 are to be taken somewhat in excess of maximum cross-sectional thickness values $\delta_1^1$, $\delta_2^1$, $\delta_3^1$ of the blank 4 (indicated by a dot-and-dash line in the drawing) at the sections defined by the respective component pieces 1, 2, 3. The component pieces 1, 2, 3 are interconnected through welding, the respective weld joints being indicated at Ref. No. 5 in FIG. 2. Outlined by a dotted line in said drawing is the blank contours when the blank is made of a solid sheet. As one can see from the drawing, when making the blank 4 according to the proposed method, rolled sheet stock is saved at the expense of areas 6 and 7. Then the cut blank 4 is subject to machining to obtain the required contour thereof. The machined blank 4 is illustrated in FIG. 3. This operation involves reduced labour consumption for the machining process due to absence of metal within the areas 6 and 7 (FIG. 2).

The blank (FIG. 3) machined along its contour is put in between shaping elements 8, 9 (FIG. 4) of a die unit to bend it into a preset shape of a blade 10. A perspective view of the finished blade 10 is illustrated in FIG. 5.

When estimating the number of component pieces of a plain sheet blank account should taken of the actual curvature of the blade contour, production capacity of sheet mills and cost of welding jobs. However, in every case the blank welded from a number of sheet pieces is more economic than that cut from a solid rolled sheet.

We claim:

1. A method of making blades comprising the steps of: rolling at least two flat metal sheets having rectangular cross-sections and different thicknesses; cutting from each sheet a piece of flat sheet stock; placing said pieces side-by-side, said pieces cooperating to comprise a plain blank of said blade in a desired direction of principal variation of the cross-sectional thickness thereof, said blank having the lateral dimensions defined by the developed contour of the blade be made; the thickness of each of said pieces being at least equal to the maximum cross-sectional thickness of said blank at the portion thereof defined by said piece; welding adjacent edges of said pieces together to obtain said plain sheet blank; machining said blank to obtain a required contour of said blank for the blade to be made; and bending said machined plain blank into the desired shape of said blade.

* * * * *

UNITED STATES PATENT AND TRADEMARK OFFICE
CERTIFICATE OF CORRECTION

PATENT NO. : 4,164,061

DATED : August 14, 1979

INVENTOR(S) : Grigory A. Bronovsky, et al

It is certified that error appears in the above—identified patent and that said Letters Patent is hereby corrected as shown below:

Column 1, lines 35-36: "sheet thickness eventuates" should be deleted.

Signed and Sealed this

Twenty-second Day of April 1980

[SEAL]

Attest:

SIDNEY A. DIAMOND

Attesting Officer

Commissioner of Patents and Trademarks